(12) United States Patent
Furuhata et al.

(10) Patent No.: US 8,855,915 B2
(45) Date of Patent: Oct. 7, 2014

(54) NAVIGATION SYSTEM, NAVIGATION APPARATUS, METHOD AND SERVER (71) Applicant: Hitachi Automotive Systems, Ltd., Ibaraki (JP)

(72) Inventors: Shunichiro Furuhata, Tokyo (JP); Tsuneo Sobue, Tokyo (JP); Hideki Takano, Kanagawa (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 65 days.

(21) Appl. No.: 13/670,565

(22) Filed: Nov. 7, 2012

(65) Prior Publication Data

US 2013/0116919 A1 May 9, 2013

(30) Foreign Application Priority Data

Nov. 9, 2011 (JP) ................................. 2011-245970

(51) Int. Cl.
*G01C 21/00* (2006.01)
*G01C 21/36* (2006.01)
(52) U.S. Cl.
CPC .................................. *G01C 21/3629* (2013.01)
USPC ......................................................... 701/408
(58) Field of Classification Search
CPC .................................................. G01C 21/3629
USPC ......................................................... 701/408
See application file for complete search history.

(56) References Cited

U.S. PATENT DOCUMENTS

| | | | |
|---|---|---|---|
| 6,255,963 B1* | 7/2001 | Heimann et al. | 340/905 |
| 6,438,561 B1* | 8/2002 | Israni et al. | 455/457 |
| 7,251,558 B1* | 7/2007 | McGrath | 701/117 |
| 7,804,860 B2* | 9/2010 | Kim et al. | 370/537 |
| 8,050,853 B2* | 11/2011 | Jung et al. | 701/117 |
| 8,150,622 B2* | 4/2012 | Kim | 701/428 |
| 2003/0083813 A1* | 5/2003 | Park | 701/210 |
| 2010/0332619 A1* | 12/2010 | Watanabe | 709/219 |
| 2011/0121991 A1* | 5/2011 | Basir | 340/902 |
| 2011/0137556 A1* | 6/2011 | Chen | 701/207 |

FOREIGN PATENT DOCUMENTS

| | | |
|---|---|---|
| JP | 2002-236029 A | 8/2002 |
| JP | 4682658 B2 | 2/2011 |

* cited by examiner

*Primary Examiner* — Mary Cheung
*Assistant Examiner* — Frederick Brushaber
(74) *Attorney, Agent, or Firm* — Volpe and Koenig, P.C.

(57) ABSTRACT

A navigation system comprises a detection part for detecting a location and a speed of a navigation apparatus, a voice message weight storage part for storing voice message weight association information, which associates a weight with each of multiple voice messages, a rule storage part for storing priority rule information denoting a rule for deciding a priority for each of multiple voice messages, a priority decision part for deciding a priority for each of the multiple voice messages based on the priority rule information, and a voice output part for outputting from the navigation apparatus multiple voice messages in a sequence conforming to the decided priority. The rule denoted by the priority rule information is a rule for deciding the priority for each voice message based on the detected location and speed of the navigation apparatus, and the weight of each voice message denoted by the voice-weight association information.

11 Claims, 9 Drawing Sheets

Hazard location table

| Contents | Output condition | Attribute | Weight |
|---|---|---|---|
| Turn right in 500 meters | 500 meters before guidance location | Route guidance | 60 |
| Turn left in 500 meters | 500 meters before guidance location | | |
| 100 meters to client's house | 100 meters before guidance location | | |
| Overgrown branches | 500 meters before hazard location | Hazard location information | 80 |
| Watch out for children/bicycles entering road | 500 meters before hazard location | | |
| Watch out for oncoming traffic | 100 meters before hazard location | | |
| No parking area | Business information-based location | Business information | 20 |
| Incoming message from headquarters | Upon arrival of message | | |
| ... | ... | ... | ... |

401    402    403    404

Guidance priority table

FIG. 5

| Driver ID | Evaluation score | | |
| --- | --- | --- | --- |
| | Steering evaluation score | Braking evaluation score | Acceleration evaluation score |
| Driver A | 100 | 30 | 40 |
| Driver B | 60 | 80 | 40 |
| Driver C | 20 | 40 | 30 |
| ... | ... | ... | ... |

Driving history table

| Guidance attribute | Priority calculation formula |
|---|---|
| Route guidance | Weight × 1/distance (km) to guidance location × speed (km/h) × 1/steering evaluation score × 1/braking evaluation score |
| Hazard location information | Weight × 1/distance (km) to hazard location × speed (km/h) + weight × 1/braking evaluation score × number of hazard location reports |
| Business information | Weight × 1/distance (km) to location based on business information × speed (km/h) − next road guidance priority or hazard location information priority |
| ... | ... |

Priority computation table

FIG. 8

NAVIGATION SYSTEM, NAVIGATION APPARATUS, METHOD AND SERVER

CROSS-REFERENCE TO PRIOR APPLICATION

This application relates to and claims the benefit of priority from Japanese Patent Application number 2011-245970, filed on Nov. 9, 2011 the entire disclosure of which is incorporated herein by reference.

BACKGROUND

The subject matter to be disclosed relates to a navigation system, which uses voice guidance.

A navigation apparatus having a voice-based route guidance function has been known for some time. The voice route guidance function is a function for outputting, in the form of a voice output, guidance information, such as the name of an intersection, the distance to the intersection, and directional guidance when a vehicle approaches an intersection where either a right turn or a left turn will be made. A navigation apparatus having a voice hazard location warning function is also known. The voice hazard location warning function is a function, which records a location, where an accident has occurred in the past, or a location, which a user feels is dangerous (hereinafter referred to as hazard location), and when the vehicle approaches a hazard location, performs a voice output of hazard location information, such as the distance to the hazard location, and the type of hazard associated with this hazard location based on this record.

There has been an increase in navigation apparatuses like those described above, which perform voice route guidance and/or hazard location warnings by outputting guidance information and/or hazard location information (hereinafter referred to as voice message). Route guidance and/or a hazard location warning by outputting a voice message must be performed prior to reaching the intersection and/or hazard location. However, in a case where voice messages must be overlappingly outputted as a result of multiple intersections and hazard locations existing within a certain range (for example, a case in which the output of a certain voice message must commence before the output of a different voice message has ended), the vehicle may reach the intersection or hazard location, or travel past the intersection or hazard location before the outputting of the voice messages has ended.

To solve for the above-mentioned problems, the following navigation apparatuses have been disclosed.

For example, a navigation apparatus has been disclosed in which a priority is stipulated beforehand for each voice message, and in a case where outputted voice messages overlap, the voice messages are outputted in order beginning with the voice message having the highest priority (Japanese Patent Application Laid-open No. 2002-236029).

Furthermore, for example, there has also been disclosed a navigation apparatus, which stipulates a priority beforehand for each voice message category, such as traffic information and route guidance information, determines whether or not multiple voice messages are to be overlappingly outputted based on the time when a voice message is outputted and the time when the vehicle arrives at an intersection or a hazard location, and in a case where the result of the determination is that voice messages will overlap, outputs the highest priority voice message (Japanese Patent Publication No. 4682658).

According to the conventional navigation apparatuses described hereinabove, the sequence of the voice messages when voice messages are overlappingly outputted is in accordance with the priority of the voice message, and this priority is a predetermined fixed value. Thus, the voice message output sequence is not always suitable to the state of the vehicle.

SUMMARY

A navigation technology, which makes it possible to output voice messages in a sequence suitable to the state of the vehicle, is disclosed.

A navigation system, which includes a navigation apparatus for carrying out guidance by outputting a voice message, and a server for communicating with the navigation apparatus, further includes a detection part for detecting a location and a speed of the navigation apparatus, a voice message weight storage part for storing voice message weight association information, which associates a weight with each of multiple voice messages, a rule storage part for storing priority rule information denoting a rule for deciding a priority for each of multiple voice messages, a priority decision part for deciding a priority for each of the above-mentioned multiple voice messages based on the priority rule information, and a voice output part for outputting from the navigation apparatus multiple voice messages in a sequence conforming to the decided priority. The rule denoted by the priority rule information is a rule for deciding the priority for each voice message based on the detected location and speed of the navigation apparatus, and the weight of each voice message denoted by the voice message weight association information. The priority rule information, for example, may be a calculation formula or a correspondence table, or may be expressed using another format.

According to the teaching herein, it is made possible to output voice messages in a sequence, which is suitable to the state of a vehicle.

The details of one or more implementations of the subject matter described in the specification are set forth in the accompanying drawings and the description below. Other features, aspects, and advantages of the subject matter will become apparent from the description, the drawings, and the claims.

DETAILED DESCRIPTION OF THE EMBODIMENTS

The embodiment will be explained by referring to the drawings. In the drawings, like reference signs designate like elements.

Figure 1:
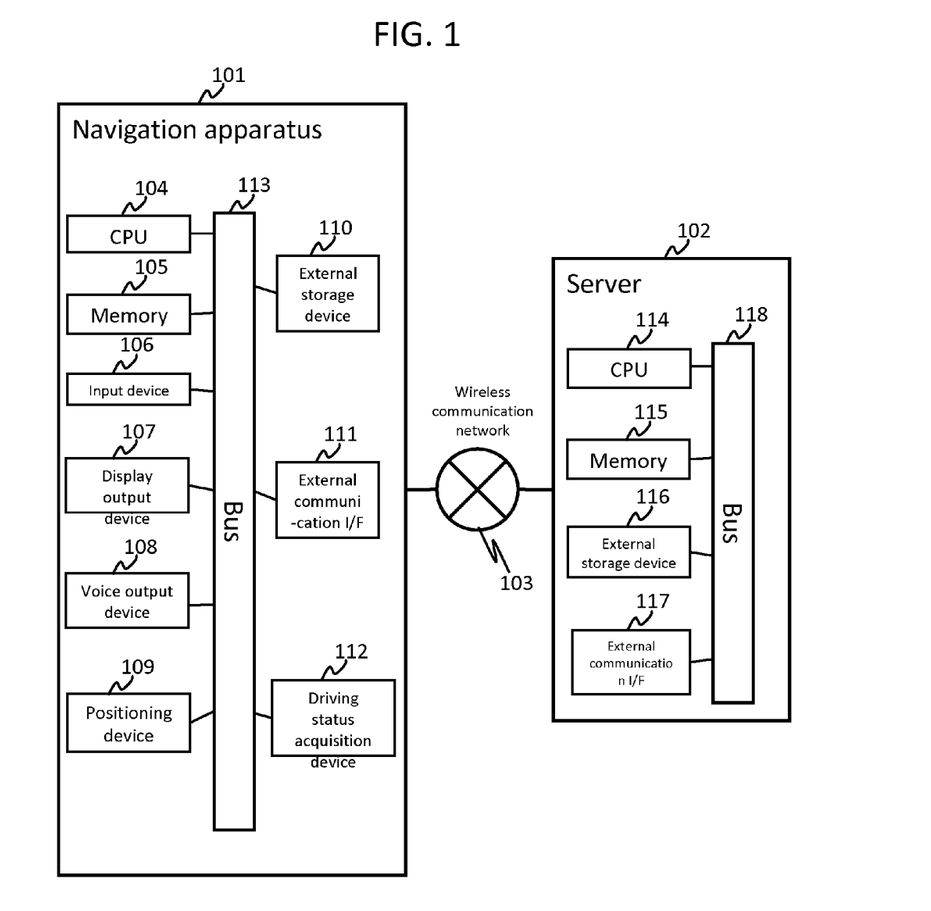
FIG. 1 shows an example of the hardware configuration of a navigation system related to an embodiment.

FIG. 1 is a drawing showing the hardware configuration of a navigation system related to the embodiment.

Furthermore, in the following explanation, various types of information may be explained using the expression "xxx table", but the various information may also be expressed using a data structure other than a table. To show that the various information is not dependent on the data structure, "xxx table" can be called "xxx information".

It is supposed that the navigation system related to the embodiment includes a commercial car navigation apparatus used by a courier or other vendor, and regional delivery center portal servers for exchanging information with the navigation apparatus.

The navigation system includes a navigation apparatus capable of voice guidance (referred to simply as navigation apparatus hereinafter) 101, and a center portal server (hereinafter, server) 102 coupled to the navigation apparatus 101 via a wireless communication network 103. The wireless communication network 103, for example, may be the Internet.

The navigation apparatus 101 includes a CPU 104, a memory 105, which is a temporary storage area, an input device 106, such as a touch panel or a switch, a display output device 107 for controlling a display screen of a display, a voice output device 108 for controlling audio outputted from a speaker, a positioning device 109, which includes a GPS signal receiver and an inertial sensor, an external storage device 110 including a hard disk drive, a flash memory or other such auxiliary storage device, an external communication interface (hereinafter, external communication I/F) 111 for connecting to a network, such as the Internet, a driving status acquisition device 112 including a sensor, which recognizes a user (driver) operation, and a bus 113 for coupling the above-mentioned devices 104 through 112 to one another. The external storage device 110 may exist outside of the navigation apparatus 101.

The server 102 includes a CPU 114, a memory 115, which is a temporary storage area, an external storage device 116 including a hard disk drive, a flash memory, or other such auxiliary storage device, an external communication interface (hereinafter, external communication I/F) 117 for connecting to a network, such as the Internet, and a bus 118 for coupling the above-mentioned devices 114 through 117 to one another. The external storage device 116 may exist outside of the server 102.

Figure 2:
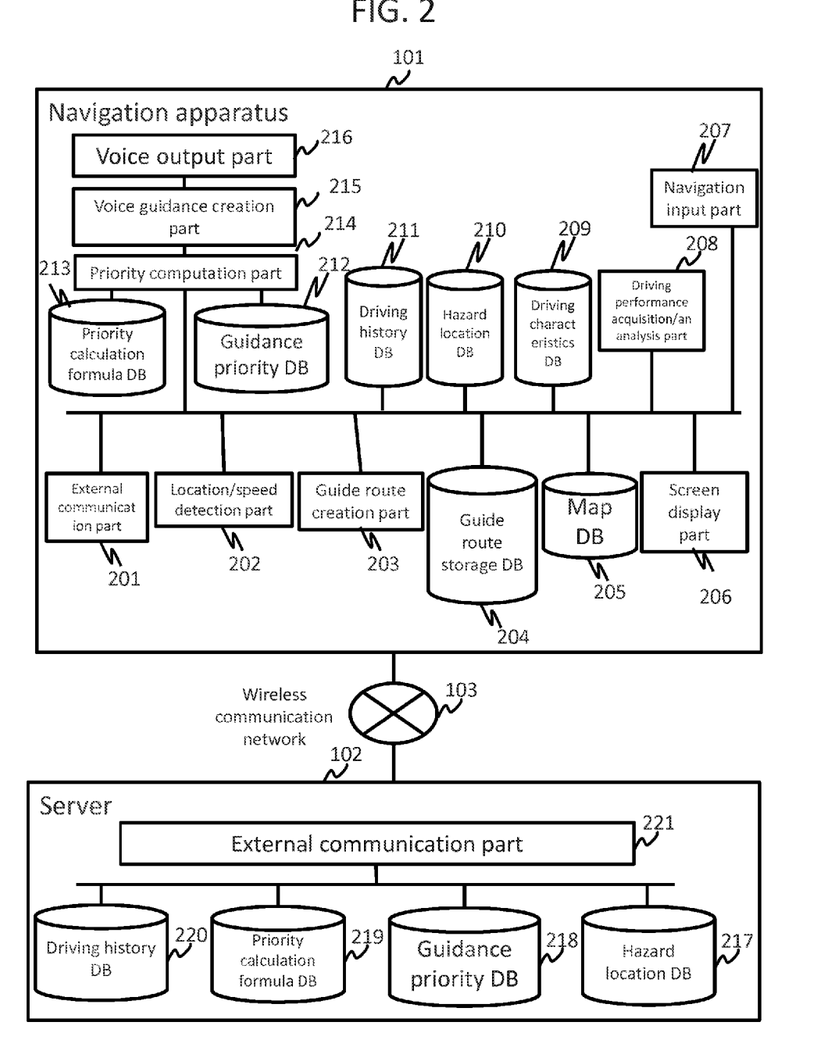
FIG. 2 illustrates a functional block of the navigation system related to the embodiment.

FIG. 2 is a functional block diagram of the navigation system related to the embodiment.

The navigation apparatus 101 includes an external communications part 201, a location/speed detection part 202, a guide route creation part 203, a guide route storage DB 204, a map DB 205, a screen display part 206, a navigation input part 207, a driving performance acquisition/analysis part 208, a driving characteristics DB 209, a hazard location DB 210, a driving history DB 211, a guidance priority DB 212, a priority calculation formula DB 213, a priority computation part 214, a voice guidance creation part 215, and a voice output part 216.

The guide route storage DB 204, the map DB 205, the driving characteristics DB 209, the hazard location DB 210, the driving history DB 211, the guidance priority DB 212, and the priority calculation formula DB 213 are each built on the external storage device 110. Also, the external communications part 201, the location/speed detection part 202, the guide route creation part 203, the screen display part 206, the navigation input part 207, the driving performance acquisition/analysis part 208, the priority computation part 214, the voice guidance creation part 215, and the voice output part 216 are all realized in accordance with the CPU 104 executing a prescribed program, but either instead of or in addition thereto, may be realized using a hardware circuit.

The external communication part 201 sends/receives data to/from the server 102 in accordance with being invoked by the external communication I/F 111. Specifically, for example, the external communication part 201 sends driving characteristics DB 209 data to the server 102, and receives data, which is stored in the hazard location DB 217, the guidance priority DB 218, the priority calculation formula DB 219, and the driving history DB 220 and sent by the server 102.

The location/speed detection part 202 detects the location and speed of the vehicle (that is, the location and speed of the navigation apparatus mounted in the vehicle). The vehicle location is detected based on the latitude and longitude measured by the positioning device 109. The speed of the vehicle is calculated from the location of the vehicle at multiple points in time. The location/speed detection part 202 sends a detected vehicle location and speed to the guide route creation part 203.

The guide route creation part 203 creates a guide route based on data sent from the location/speed detection part 202 and a user request sent from the navigation input part 207, which will be explained further below. Specifically, for example, the guide route creation part 203 creates a guide route based on the current location of the vehicle received from the location/speed detection part 203 and a destination received from the navigation input part 207, which will be explained further below, and stores information denoting the created guide route in the memory 105. Then, the guide route creation part 203 reads the guide route stored in the memory 105 and hazard location information stored in the hazard location DB 210, adds the hazard location information to the guide route, and creates a guide route complete with hazard location information. The created guide route complete with hazard location information is stored in the guide route storage DB 204. The guide route creation part 203, for example, may be configured to do another search for a detour route in a case where a traffic jam is encountered along the guide route.

The map DB 205 stores map information.

The screen display part 206 reads the guide route complete with hazard location information stored in the guide route storage DB 204 and map information of the map DB 205, and collectively outputs this information to the display output device 107. The screen display part 206 also receives a user request sent from the navigation input part 207 and reflects this request on the display output device 107.

The navigation input part 207 analyzes the addresses of various requests inputted by the user via the input device 106, and sends the analyzed requests to the screen display part 206 and/or the guide route creation part 203. The navigation input part 207 also sends, to the server 102, the server hazard location information inputted to the input device 106 by the user.

The driving performance acquisition/analysis part 208 acquires the driving performance characteristics of the user (as used here, the driver driving the vehicle). The driving performance characteristics of the driver, for example, are acquired beginning from a location a prescribed distance prior to an intersection (hereinafter, characteristics acquisition start location) and continuing up to the intersection. The acquired driver driving performance characteristics are characteristics such as the steering, braking, and acceleration of the driver. The acquisition of the driving performance characteristics of the driver is performed by the positioning device 109 and the driving status acquisition device 112. The steering characteristics include whether the driver turns the steering wheel suddenly or slowly. For example, this is information such as the point at which the driver begins to turn the steering wheel and at how much of an angle the steering wheel is turned from the characteristics acquisition start location up to the intersection. The acquisition of braking performance includes whether the driver applies the brakes suddenly or depresses the brake slowly. For example, this is information such as the point at which the driver begins to apply the brakes, and the amount of pressure puts on the brake from the characteristics acquisition start location up to the intersection. The acceleration characteristics include whether the driver suddenly presses down hard on the accelerator or whether the driver presses down gently on the accelerator. For example, this is information such as the point at which the driver begins to press down on the accelerator, and the amount of pressure put on the accelerator from the characteristics acquisition start location up to the intersection. The driving performance characteristics of the driver, for example, may be acquired by deciding on multiple roads beforehand and acquiring the information when the driver takes these roads, or may be acquired at every intersection. In addition, the driving performance characteristics, rather than being acquired only from the characteristics acquisition start location up to the intersection, may be acquired based on the speed of the vehicle upon passing either a hazard location or a guidance location, or may be acquired using another method. The driving performance acquisition/analysis part 208 stores the acquired driving performance characteristics of the driver in the driving characteristics DB 209 as a log (hereinafter, characteristics log).

The driving performance acquisition/analysis part 208 analyzes the acquired driving performance characteristics of the driver. Specifically, the driving performance acquisition/analysis part 208 compares the characteristics logs of each driver in the driving characteristics DB 209 to driving performance reference values sent from the server 102, grades these driving characteristics, and calculates an evaluation score for each driver. Then, the driving performance acquisition/analysis part 208 creates a driving history table 500 based on the driver evaluation scores, which have been calculated, and stores this table 500 in the driving history DB 211. The driving history table 500 will be explained in detail further below.

The characteristics log is stored in the driving characteristics DB 209. The characteristics log stored in the driving history DB 209, for example, is sent to the driving history DB 220 of the server 102 by the driving performance acquisition/analysis part 208. The characteristics log may be sent to the driving history DB 220, for example, each time driving has ended or at scheduled times.

A hazard location table 300 sent from the server 102 is stored in the hazard location DB 210. The hazard location table 300 in the hazard location DB 210 may be configured so as to be synchronized at scheduled times with the hazard location table 300 in the hazard location DB of the server 102, which will be explained further below.

The driving history table 500 sent from the driving performance acquisition/analysis part 208 is stored in the driving history DB 211. The driving history table 500 in the driving history DB 211 may be configured so as to be synchronized at scheduled times with the driving history table 500 of a prescribed driver in the driving history DB 220 of the server 102. In addition to the driving history table 500, a history of routes driven in the past may also be stored for each driver in the driving history DB 211.

A guidance priority table 400 sent from the server 102 is stored in the guidance priority DB 212. The guidance priority table 400 stored in the guidance priority DB 212 may be configured so as to be synchronized at scheduled times with the guidance priority table 400 in the guidance priority DB 218 of the server 102, which will be explained further below.

A priority computation table 700 sent from the server 102 is stored in the priority calculation formula DB 213. The priority computation table 700 in the priority calculation formula DB 213 may be configured so as to be synchronized at scheduled times with the priority computation table 700 in the priority calculation formula DB 219 of the server 102, which will be explained further below.

The priority computation part 214 calculates a priority based on the location and speed of the vehicle. The priority is a numeric value for deciding the output sequence of voice messages. In other words, the voice message is outputted in order from the highest priority. A high-priority voice message may be outputted repeatedly. For example, the priority computation part 214 uses a priority calculation formula of the priority calculation formula DB 213 to compute a priority for a guidance message (voice message) based on information from the location/speed detection part 202, the hazard location DB 210, the guide route storage DB 204, the map DB 205, the driving history DB 211, and the guidance priority DB 212. This computation process will be explained in detail further below. The priority computation part 214 sends the calculated priority to the voice guidance creation part 215.

The voice guidance creation part 215 sorts voice messages into order from the highest priority based on the priority sent from the priority computation part 214. The voice guidance creation part 215 creates a file of the voice messages, which have been sorted into order from the highest priority, and sends the voice message file to the voice output part 216.

The voice output part 216 uses the voice output device 108 to output the voice message file sent from the voice guidance creation part 215.

The server 102 includes a hazard location DB 217, a guidance priority DB 218, a priority calculation formula DB 219, a driving history DB 220, and an external communication part 221.

The hazard location DB 217, the guidance priority DB 218, the priority calculation formula DB 219, and the driving history DB 220 are built on the external storage device 116. The function of the external communication part 221 is realized in accordance with the CPU 114 executing a prescribed program, but may be realized in accordance with a hardware circuit either instead of or in addition thereto.

The hazard location table 300 is stored in the hazard location DB 217. The hazard location table 300 will be explained in detail below.

The guidance priority table 400 is stored in the guidance priority DB 218. The guidance priority table 400 will be explained in detail below. A priority calculation formula table 900 is stored in the priority calculation formula DB 219. The priority calculation formula table 900 will be explained in detail below.

The driving history table 500 is stored in the driving history DB 220. The driving history table 500 will be explained in detailed below. A history of routes driven in the past may also be stored for each driver in the driving history DB 220.

The external communication part 221 sends/receives data to/from the navigation apparatus 101 in accordance with being invoked by the external communication I/F 117. Specifically, the external communication part 221 receives driving characteristics DB 209 data from the navigation apparatus 101, and sends the data of the hazard location DB 217, the guidance priority DB 218, the priority calculation formula DB 219, and the driving history DB 220 to the navigation apparatus 101.

Figure 3:
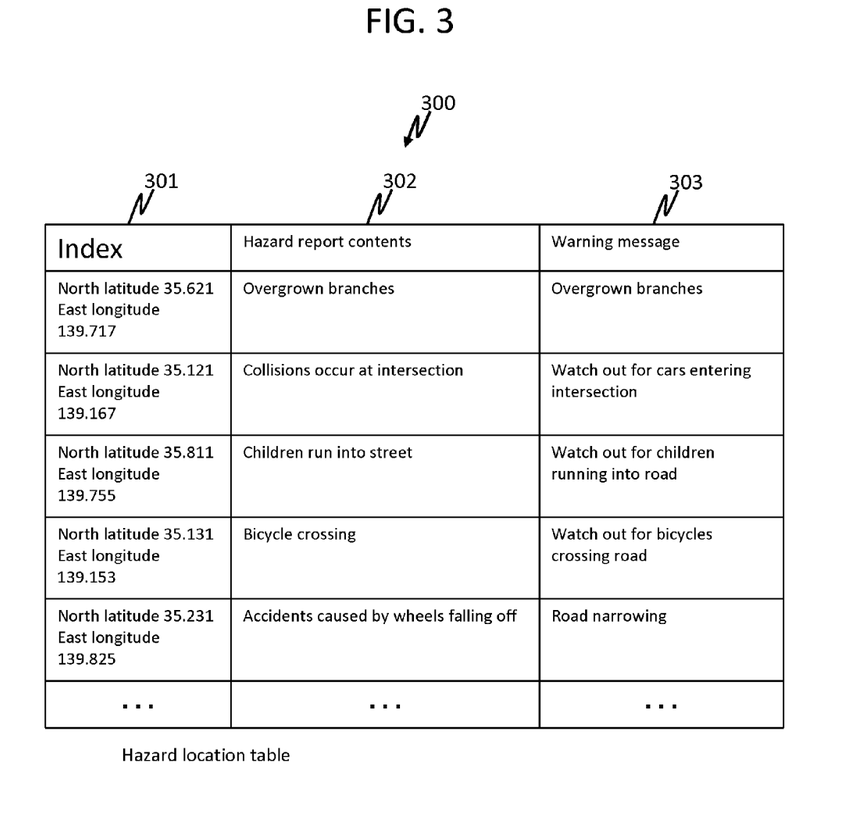
FIG. 3 shows an example of a hazard location table.

FIG. 3 is an example of the hazard location table 300 recorded in the hazard location DB 217 of the server 102 and the hazard location DB 210 of the navigation apparatus 101.

The hazard location table 300, for example, is created by either the server 102 or a management apparatus (not shown in the drawing) coupled to the server 102 based on hazard location information collected by the navigation apparatus 101. In accordance with this, the hazard location table 300 may be created on the basis of user-registered hazard location information from multiple navigation apparatuses 101, which send/receive information to/from the server 102. Either in addition thereto or instead thereof, the hazard location table 300, for example, may be created based on hazard location information collected by the server 102, such as accident information announced by the police department and so forth. The hazard location DB 210 and the hazard location DB 217 may be synchronized at scheduled times.

The hazard location table 300 includes a coordinates 301, a hazard report contents 302, and a warning message 303 column for each hazard location.

The coordinates 301 is information showing the location of a hazard location using latitude and longitude. The coordinates 301 may also be GPS coordinates or the like along with the latitude and longitude.

The hazard report contents 302 is information showing either a past or present hazard location event (type of hazard that occurs). The hazard report contents 302 may be an event anticipated as being capable of occurring at the hazard location.

The warning message 303 is information (for example, a character string configured using numerals and/or characters) denoting a message outputted from the navigation apparatus 101 when the navigation apparatus 101 approaches a hazard location. The warning message 303 may be configured by the server 102 when creating (or revising) the hazard location table 300, or may be manually configured (updated) by the user in accordance with the hazard report contents 302.

According to the example shown in the drawing, because there are overgrown branches at a hazard location located at coordinates "north latitude 35.621, east longitude 139.717", a voice message stating "overgrown branches" is outputted from the navigation apparatus 101 prior to passing through this hazard location.

Figure 4:
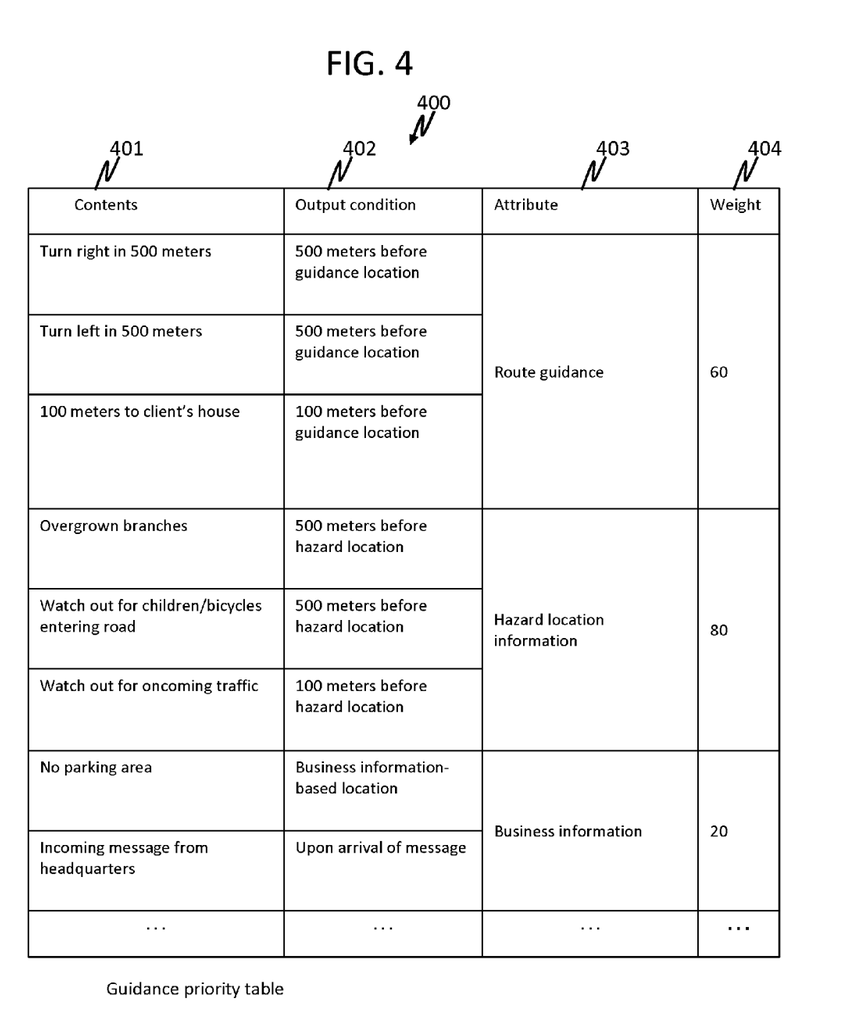
FIG. 4 shows an example of a guidance priority table.

FIG. 4 shows an example of a guidance priority table 400 recorded in the guidance priority DB 212 of the navigation apparatus 101 and the guidance priority DB 218 of the server 102.

The guidance priority table 400 is created by either the server 102 or a management apparatus (not shown in the drawing) coupled to the server 102. The guidance priority DB 212 and the guidance priority DB 218, for example, may be synchronized at scheduled times.

A contents 401, an output condition 402, an attribute 403, and a weight 404 are stored in the guidance priority table 400.

Information denoting a message, which is outputted by voice from the voice output device 108, is stored in the contents 401. The contents 401 is outputted when an output condition 402 corresponding thereto is met. The contents 401 may be configured by the server 102 when creating (or revising) the guidance priority table 400, or the guidance priority table 400 stored in the guidance priority DB 212 of the navigation apparatus 101 may be manually configured (updated) by the user. The contents 401 includes hazard location information outputted when approaching a hazard location, route guidance information outputted when approaching a guidance location, and business information outputted when approaching a business information-based location and when it is necessary to issue a notification based on other business information. The hazard location information may be the same information as the warning message 303 of the hazard location table 300.

The output condition 402 is a condition for outputting a voice message, and is configured for each item of the contents 401. In a case where voice messages to be outputted will overlap, the sequence for outputting the voice messages 1 is decided in accordance with performing a voice message output sequence decision process (refer to FIG. 9), which will be explained further below.

The attribute 403 shows the attribute of the voice message (content 401). The attribute includes the hazard location information, route guidance information, and business information explained hereinabove.

The weight 404 is a value showing the degree of importance of each attribute 403. The weight 404 may be configured by the server 102 when creating (or revising) the guidance priority table 400, or may be configured (revised) manually by the user on the navigation apparatus 101 side.

In the example shown in the drawing, the weight is configured to "60" for the route guidance information, is configured to the heavier weight of "80" for the hazard location information, and is configured to the lightest weight of "20" for the business information. It is also supposed that the voice message "turn right in 500 meters" is outputted 500 m before the guidance location.

Figure 5:
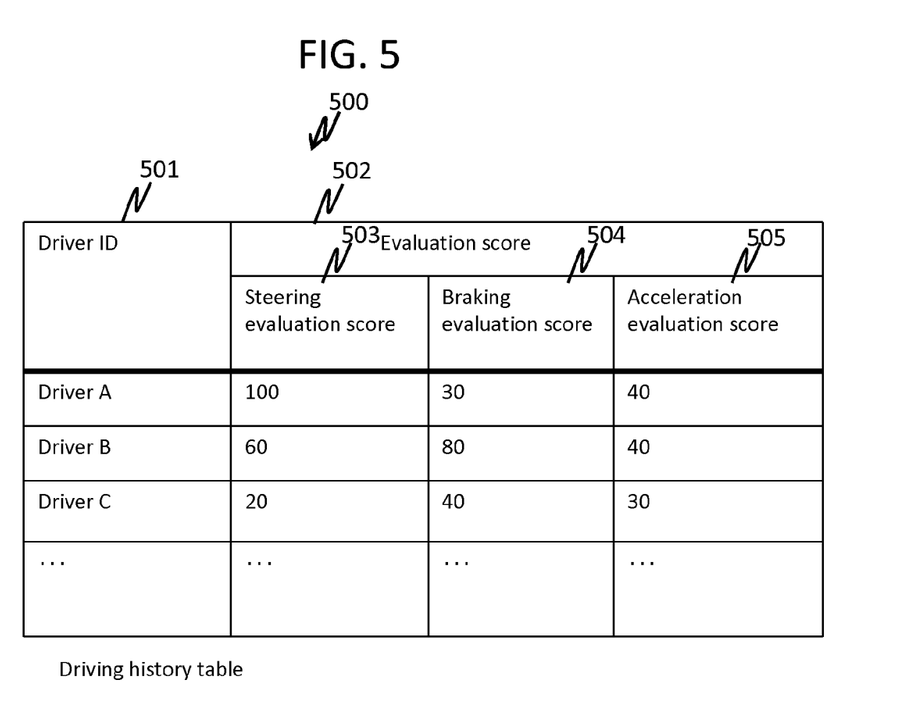
FIG. 5 shows an example of a driving history table.

FIG. 5 is an example of the driving history table 500 recorded in the driving history DB 211 of the navigation apparatus 101 and the driving history DB 220 of the server 102.

The driving history table 500 is created by the driving performance acquisition/analysis part 208 of each navigation apparatus 101. The driving history table 500 is created on the basis of the characteristics log in the driving characteristics DB 209 and the driving performance reference values sent from the server 102. The characteristics log is a log (not shown in the drawing) for acquiring a driver's driving performance for each of steering, braking, and acceleration. The characteristics log for steering is a record of the point at which the driver begins to turn the steering wheel and at how much of an angle the steering wheel is turned from the characteristics acquisition start location up to the intersection. The characteristics log for braking is a record of the point at which the driver begins to apply the brakes suddenly and the amount of pressure put on the brake from the characteristics acquisition start location up to the intersection. The characteristics log for acceleration is a record of the point at which the driver begins to press down on the accelerator and the amount of pressure put on the accelerator from the characteristics acquisition start location up to the intersection. Meanwhile, the driving performance reference values are calculated by a management apparatus (not shown in the drawing) of the server 102. The driving performance reference values may make use of the driving performance characteristics of a prescribed driver, who has skillful driving performance (or who exhibits standard driving performance). The driving performance reference values may be calculated by acquiring the characteristics logs of multiple drivers from multiple navigation apparatuses 101 and using the average values thereof (or using the highest values thereof). The driving history table 500 is created in accordance with calculating the evaluation scores 502 of each driver by comparing the characteristics logs to the driving performance reference values.

The driving history table 500 includes a driver ID 501 and an evaluation score 502 for each driver.

The driver ID 501 is an identification number of a driver registered in the server 102 and/or the navigation apparatus 101.

The evaluation score 502 is the evaluation score obtained when the characteristics log of each driver is compared to the driving performance reference value. In the example shown in the drawing, the evaluation score 502 is configured using a steering evaluation score 503, a braking evaluation score 504, and an acceleration evaluation score 505. The evaluation scores 503 through 505 for each driver, for example, are grades assigned to the characteristics log of the driver by treating the driving performance reference value as 100.

Figure 6:
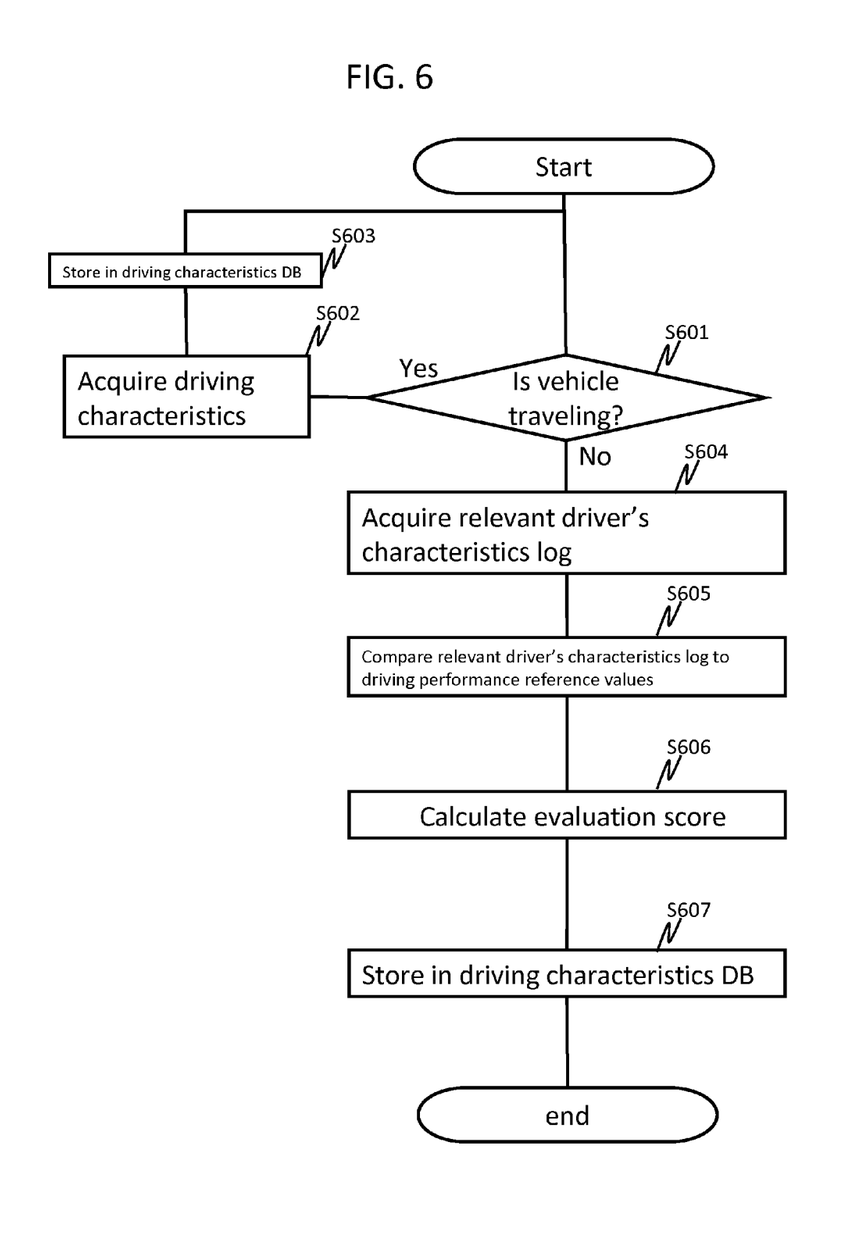
FIG. 6 exemplifies the flow of calculations for evaluation scores of the driving history table.

FIG. 6 is the flow of calculations for the evaluation score 502 of the driving history table 500.

The evaluation score 502 is calculated by the driving performance acquisition/analysis part 208.

In Step S601, the driving performance acquisition/analysis part 208 determines whether or not the vehicle is traveling. In a case where the vehicle is traveling, the driving performance acquisition/analysis part 208 advances to Step S602. Alternatively, in a case where the vehicle is not traveling, the driving performance acquisition/analysis part 208 advances to Step S604.

In Step S602, the driving performance acquisition/analysis part 208 acquires the driving performance characteristics of a driver. The driving performance characteristics of the driver, that is, the driver's steering, braking, and acceleration characteristics are respectively acquired from the characteristics acquisition start location up to the intersection.

In Step S603, the driving performance acquisition/analysis part 208 stores the steering, braking, and acceleration characteristics of the driver acquired in Step S602 in the driving characteristics DB 209 as a characteristic log. The characteristics log is accumulated in the driving characteristics DB 209 by repeating Steps S601 through S603 while the vehicle is traveling.

Alternatively, in a case where the vehicle is not traveling in Step S601 (S601: No), in Step S604, the driving performance acquisition/analysis part 208 acquires the characteristics log of the relevant driver from the driving characteristics DB 209.

In Step S605, the driving performance acquisition/analysis part 208 compares the characteristics log of the relevant driver acquired in Step S604 to the driving performance reference values. Specifically, for example, in the space from the characteristics acquisition start location to the intersection, the characteristics log and the reference values are compared with respect to the following multiple types of operations: (steering) the location at which the driver begins to turn the steering wheel and the angle at which the steering wheel is turned; (braking) the location at which the driver begins to apply the brakes and the amount of pressure applied to the brake; and (acceleration) the location at which the driver begins to press down on the accelerator and the amount of pressure applied to the accelerator. In accordance with this, the difference between the characteristics log of the relevant driver and the driving performance reference value is calculated for one type of operation.

In Step S606, the driving performance acquisition/analysis part 208 calculates the evaluation score from the difference between the relevant driver's characteristics log calculated in Step S605 and the driving performance reference value. The evaluation score is calculated using a driving evaluation algorithm. The driving evaluation algorithm is an algorithm for calculating the evaluation score by grading the driving characteristics reference value (for example, treating all the reference values as 100 points), grading the difference between the relevant driver's characteristics log and the driving performance reference value, and subtracting the graded difference from the graded reference value.

In Step S607, the driving performance acquisition/analysis part 208 registers the evaluation score calculated in Step S605 in the driving history table 500. That is, the driving performance acquisition/analysis part 208 registers the steering evaluation score 503, the braking evaluation score 504, and the acceleration evaluation score 505 corresponding to the driver ID 501 of the relevant driver in the driving history table 500. Then, the driving performance acquisition/analysis part 208 stores the driving history table 500 in which the evaluation scores 503 through 505 were registered in the driving history DB 211.

Figure 7:
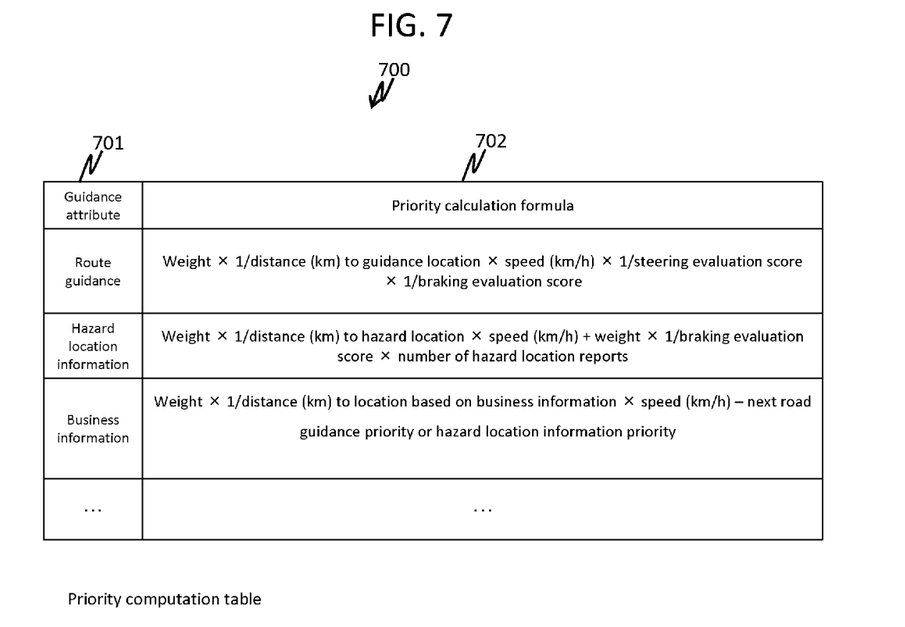
FIG. 7 shows an example of a priority calculation formula table.

FIG. 7 is an example of the priority calculation formula table 700 recorded in the priority calculation formula DB 112 of the navigation apparatus 101 and the priority calculation formula DB 219 of the server 102.

In the priority calculation formula table 700, a priority calculation formula 702 is associated with an attribute 701 for each attribute.

Voice message attribute information is stored in the attribute 701 the same as the attribute 403 of the guidance priority table 400. That is, the attribute 701 includes the hazard location information, the route guidance information, and the business information described hereinabove.

The priority calculation formula 702 stores a formula for computing the priority of each guidance attribute 701. The priority is computed by the priority calculation formula part 214 in a case where multiple locations of any of a vehicle hazard location, a guidance location, or a location based on business information ((hereinafter collectively referred to as hazard location) has been detected while traveling along the guide route. The details thereof will be explained further below. The priority calculation formula 702 for each attribute 701 will be explained hereinbelow.

In a case where the attribute is the route guidance information, the priority is computed based on the speed of the vehicle, the distance to the guidance location, the weight, and an evaluation score. Specifically, the priority is computed by multiplying the inverse of the distance to the guidance location, the speed, the inverse of the steering evaluation score, and the inverse of the braking evaluation score by the weight. Therefore, the priority will become higher the shorter the distance from the vehicle (the navigation apparatus 101) to the guidance location and the faster the speed of the vehicle. The priority also becomes higher the larger the weight with respect to the route guidance information. In addition, the priority becomes higher the lower the steering evaluation score and braking evaluation score of the driver are.

In a case where the attribute is the hazard location information, the priority is computed based on the speed of the vehicle, the distance to the hazard location, the weight, the evaluation score, and the number of hazard location reports. Specifically, the priority is computed by adding a value obtained by multiplying the inverse of the distance to the hazard location and the speed of the vehicle by the weight to a value obtained by multiplying the inverse of the braking evaluation score and the number of hazard location reports by the weight. Therefore, the priority will become higher the shorter the distance to the hazard location and the faster the speed of the vehicle. The priority also becomes higher the larger the weight with respect to the hazard guidance information. In addition, the priority becomes higher the lower the driver's braking evaluation score and the more numerous the number of hazard location reports. The number of hazard location reports is the number of times that a hazard location has been reported to the server 102, and, specifically, is the number of times the hazard report contents 302 of the hazard location table 300 has been reported (not shown in the drawing).

In a case where the attribute is the business information, the priority is computed based on the speed of the vehicle, the distance to the business location, the weight, and another priority. Specifically, the priority is computed by subtracting the priority computed using, from among multiple warning locations, either a guidance location or a hazard location other than the business location from a value obtained by multiplying the inverse of the distance to the business location and the speed of the vehicle by the weight. Therefore, the priority will become higher the shorter the distance to the hazard location and the faster the speed of the vehicle. The priority also becomes higher the larger the weight with respect to the business location information. In addition, the priority is lower than a case in which the attribute is either the route guidance or the hazard location information.

The above-described priority calculation formula is an example of a formula for computing the priority. Thus, the priority calculation formula is not limited to the above-described formula. For example, the priority calculation formula for each attribute may be configured so as to multiply the inverse of the acceleration evaluation score, or may be configured some other way. However, it is preferable that the priority calculation formula be configured such that the priority becomes higher closer to the warning location, and is higher in a case where the driving performance evaluation scores of each user are low. The priority may also take information acquired from another vehicle into account. The attribute to be given priority may be decided by the user adjusting the weight.

The sequence in which voice messages are outputted is decided based on the priority calculated using the priority calculation formula.

Figure 8:
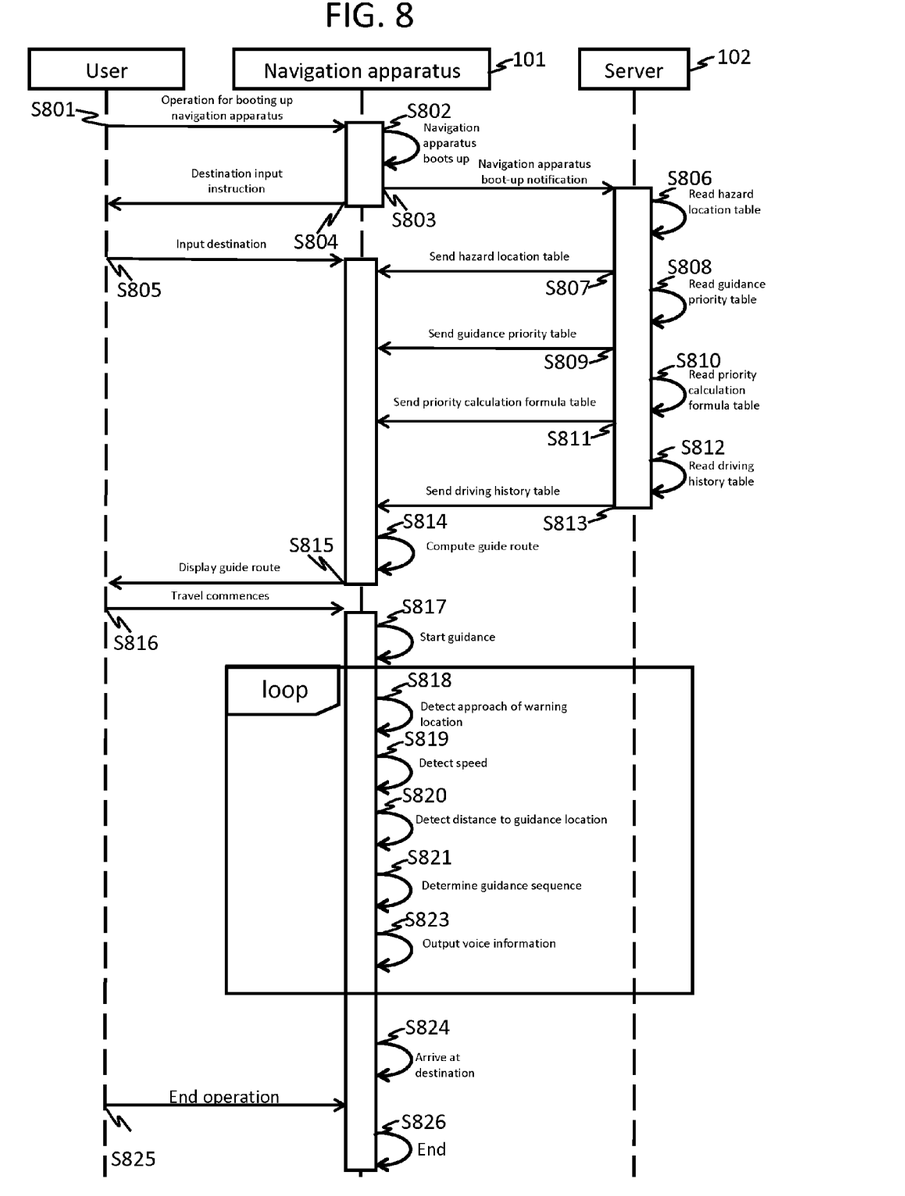
FIG. 8 exemplifies the sequence of operations by the navigation system.

FIG. 8 shows a sequence chart of the navigation system.

In Step S801, either the driver or the user (hereinafter, will be referred to as driver in this explanation) performs a boot-up operation for the navigation apparatus 101 from the navigation input part 207. In Step S802, the navigation apparatus 101 boots up.

In Step S804, the screen display part 206 of the navigation apparatus 101 displays on the display output device 107 an instruction for the driver to input a destination. The driver, having received the instruction, inputs a destination from the navigation input part 207 (Step S805).

In the meantime, in Step S803, the external communication part 201 of the navigation apparatus 101 sends a boot-up notification to the server 102.

The external communication part 221 of the server 102 receives the boot-up notification, and the server 102 performs following processing: (*) reads the hazard location table 300 from the hazard location DB 217 (Step S806), and sends the hazard location table 300 to the navigation apparatus 101 (Step S807); (*) reads the guidance priority table 400 from the guidance priority DB 218 (Step S808), and sends the guidance priority table 400 to the navigation apparatus 101 (Step S809); (*) reads the priority calculation formula table 700 from the priority calculation formula DB 219 (Step S810), and sends the priority calculation formula table 700 to the navigation apparatus 101 (Step S811); and (*) reads the driving history table 500 from the driving history DB 220 (Step S812), and sends the driving history table 500 to the navigation apparatus 101 (Step S813).

In Step S814, the guide route creation part 203 of the navigation apparatus 101 creates a guide route based on the current location of the vehicle and the driver-inputted destination, adds the hazard location information stored in the hazard location DB 210 to the guide route, creates a guide route complete with hazard location information, and stores this information in the guide route storage DB 204.

In Step S815, the screen display part 206 of the navigation apparatus 101 combines map information in the map DB 205 with the guide route complete with hazard location information in the guide route storage DB 204, and displays this information on the display output device 107.

When the location/speed detection part 202 detects that the vehicle is traveling (Step S816), the navigation apparatus 101 commences guidance in accordance with the guide route (Step S817).

Steps S818 through S823 are carried out repeatedly until the vehicle reaches the destination (that is, until Step S824). Steps S818 through S823 will be explained below.

When the vehicle approaches the warning location closest to the vehicle's current location from among the warning locations (any warning location of the hazard locations, guidance locations, or business information-based locations) while traveling along the guide route, the location/speed detection part 202 detects this warning location (Step S818). In addition, the location/speed detection part 202 also detects one or multiple warning locations, which are near the detected warning location. In accordance with this, instead of the warning location, the location/speed detection part 202 may be configured to detect the location (the output condition 402 location shown in FIG. 4) at which the output of the voice message (that is, the hazard location information, the route guidance information, or the business information) is to commence.

Then, the location/speed detection part 202 detects the current speed of the vehicle (Step S819), and, in addition, calculates the distance to each of multiple warning locations, which have been detected (Step S820).

In Step S821, the priority computation part 214 of the navigation apparatus 101 performs a voice message output sequence decision process for deciding the sequence for outputting the voice messages. This process will be explained further below.

In Step S823, the voice output part 216 of the navigation apparatus 101 outputs the voice messages in sequence based on the voice message output sequence decision process.

Upon reaching the destination (Step S824), the driver performs an end operation from the navigation input part 207 (Step S825), and the route guidance ends (Step S826).

Figure 9:
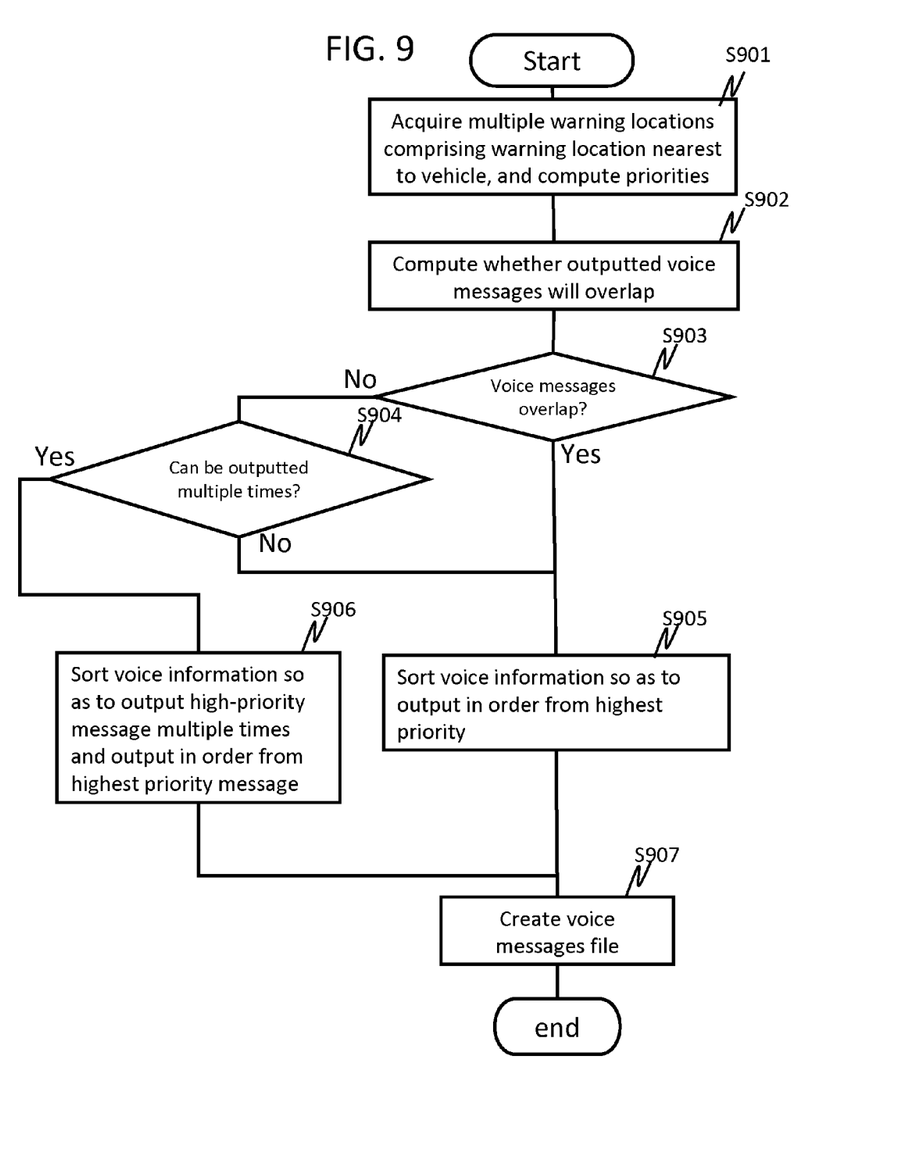
FIG. 9 exemplifies the flow for deciding a voice message output sequence.

FIG. 9 shows the flow of the voice message output sequence decision.

In Step S901, the priority computation part 214 acquires multiple warning locations to include the warning location nearest to the vehicle, and computes the priority of each location. Specifically, for example, Step S901 is performed when the vehicle approaches (for example, approaches to within a prescribed distance) a location, which meets the voice message output condition of the warning location nearest to the vehicle (the location, which meets the output condition 402 of the guidance priority table 400). At this time, the priority computation part 214 acquires the warning location nearest to the vehicle, and multiple (for example, two) warning locations, which are the next nearest to the vehicle. The priority computation part 214 references the priority calculation formula table 700, and uses the priority calculation formula corresponding to each attribute to compute a priority for each of the three warning locations acquired (refer to FIG. 7).

In Step S902, the priority computation part 214 determines whether or not voice guidance will overlap when the three voice messages are outputted in sequence. Specifically, first, the priority computation part 214 references the guidance priority table 400, and calculates each output time in a case where the three voice messages are outputted.

In Step S903, the priority computation part 214, based on the speed of the vehicle, the respective distances to the three warning locations, and the respective output times when the three voice messages are outputted, determines whether or not the voice messages will overlap (the output of a certain voice message must commence before the output of a different voice message has ended) in a case where the voice messages with respect to the warning locations are outputted in sequence. In a case where the result of the determination is that the voice message outputs will overlap, the priority computation part 214 advances to Step S905. Alternatively, in a case where the voice message outputs will not overlap, the priority computation part 214 advances to Step S904.

In Step S904, the priority computation part 214 determines whether or not the highest priority voice message can be outputted repeatedly. Specifically, the priority computation part 214, based on the speed of the vehicle, the respective distances to the three warning locations, and the respective output times when the three voice messages are outputted, determines whether or not the voice message having the highest priority is capable of being outputted repeatedly. In a case where the highest priority voice message is able to be outputted repeatedly, the priority computation part 214 advances to Step S906. Alternatively, in a case where the voice message is not able to be outputted repeatedly, the priority computation part 214 advances to Step S905.

In Step S905, the priority computation part 214, based on the result of either Step S903 or Step S904, decides the output sequence such that outputting is performed in order from the highest priority voice message. At this time, the priority computation part 214 may cancel the outputting in order from the lowest priority voice message in accordance with the voice message output time.

In Step S906, the priority computation part 214 repeatedly outputs the highest priority voice message, and, in addition, is configured such that outputting is performed in sequence from the highest priority voice message.

In Step S907, the voice guidance creation part 215 references the guidance priority table 400, and creates a voice file of the voice messages (contents 401) configured in an output sequence.

In the embodiment described hereinabove, it is supposed that the navigation system includes a commercial car navigation apparatus used by a courier or other vendor, and regional delivery center portal servers for exchanging information with the navigation apparatus. The navigation apparatus in the navigation system, however, may be a home car navigation apparatus, a PND (Portable Navigation Device), or a navigation device that uses either a cell phone or a smartphone.

In the embodiment described hereinabove, the navigation apparatus 101 includes a driving performance acquisition/analysis part 208. However, the driving performance acquisition/analysis part may be included in the server 102. In accordance with this, the characteristics log stored in the driving characteristics DB 209 is sent to the server 102 at scheduled times, and the server 102 driving performance acquisition/analysis part compares the characteristics log to the driving performance reference values, calculates the evaluation scores, and creates the driving history table 500.

In the embodiment described hereinabove, the guide route creation part 203 and the guide route storage DB 204 are constructed in the navigation apparatus 101, but the present invention is not limited thereto. For example, a guide route creation part and/or guide route storage DB may be constructed in the server.

Although the present disclosure has been described with reference to example embodiments, those skilled in the art will recognize that various changes and modifications may be made in form and detail without departing from the spirit and scope of the claimed subject matter.

What is claimed is:

1. A navigation system, comprising:
  a navigation apparatus configured to carry out guidance by outputting a voice message;
  a location and speed detector, configured to detect a location and a speed of the navigation apparatus;
  a voice message weight storage, configured to store voice message weight association information, which associates a weight with each of multiple voice messages;
  a rule storage, configured to store priority rule information denoting a rule for deciding a priority for each of the multiple voice messages;
  a priority decision module, configured to decide a priority for each of the multiple voice messages based on the priority rule information;
  a voice output, configured to output the multiple voice messages from the navigation apparatus in a sequence conforming to the decided priority,
  a server configured to communicate with the navigation apparatus, the server including a reference driving performance information transmitter configured to send reference driving performance information to the navigation apparatus, wherein the reference driving performance information is driving performance characteristics information constituting a reference;
  the navigation apparatus includes:
    a characteristics acquisition receiver configured to acquire driving performance characteristics of a driver, who drives a vehicle including the navigation apparatus; and
    an evaluation score calculator configured to calculate an evaluation score of the driver based on the reference driving performance information and the driving performance characteristics of the driver;
  wherein a rule denoted by the priority rule information is a rule for deciding a priority for each voice message based on: the detected location and speed of the navigation apparatus, the weight of each of the voice messages denoted by the voice message weight association information, and the evaluation score of the driver.

2. The navigation system according to claim 1, wherein:
  the server further includes:
    a message weight transmitter, configured to send the voice message weight association information to the navigation apparatus, and
    a rule transmitter, configured to send the priority rule information to the navigation apparatus,
  the navigation apparatus further includes the voice message weight storage and the rule storage,
  the voice message weight storage is further configured to receive voice message weight association information from the server, and
  the rule storage is further configured to receive priority rule information from the server.

3. The navigation system according to claim 1, wherein the navigation apparatus further includes the priority decision module and the voice output.

4. The navigation system according to claim 1, wherein:
a weight is associated with each type of the voice messages in the voice message weight association information, and
the type of the voice messages includes any one or more of: route guidance information, hazard location information, or business information.

5. The navigation system according to claim 4, wherein the rule denoted by the priority rule information is a rule for each type of the voice messages.

6. The navigation system according to claim 1, wherein:
the characteristics acquisition receiver is further configured to acquire steering characteristics, braking characteristics, and acceleration characteristics of a driver as the driving performance characteristics of the driver, and
the evaluation score calculator is further configured to calculate a steering evaluation score, a braking evaluation score, and an acceleration evaluation score based on the driving performance characteristics of the driver.

7. The navigation system according to claim 1, wherein:
the navigation apparatus further includes a characteristics transmitter, configured to send the driving performance characteristics of the driver to the server, and
the server is further configured to calculate the reference driving performance information based on the driving performance characteristics of the driver acquired from multiple navigation apparatuses coupled to the server.

8. A navigation apparatus configured to provide voice guidance by outputting a voice message, comprising:
a location and speed detector, configured to detect a location and a speed of the navigation apparatus;
a voice message weight storage, configured to store voice message weight association information, which associates a weight with each of multiple voice messages;
a rule storage, configured to store priority rule information denoting a rule for deciding a priority for each of the multiple voice messages;
a priority decision module, configured to decide a priority for each of the multiple voice messages based on the priority rule information;
a voice output, configured to output the multiple voice messages from the navigation apparatus in a sequence conforming to the decided priority,
a reference driving performance information storage, configured to store reference driving performance information, which is driving performance characteristics information constituting a reference;
a characteristics acquisition receiver, configured to acquire driving performance characteristics of a driver, who drives a vehicle including the navigation apparatus; and
an evaluation score calculator configured to calculate an evaluation score of the driver based on the reference driving performance information and the driving performance characteristics of the driver,
wherein a rule denoted by the priority rule information is a rule for deciding a priority for each voice message based on the detected location and speed of the navigation apparatus, the weight of each of the voice messages denoted by the voice message weight association information, and the evaluation score of the driver.

9. The navigation apparatus according to claim 8, wherein:
a weight is associated with each type of the voice messages in the voice message weight association information, and
the type of the voice messages includes any one or more of: route guidance information, hazard location information, or business information.

10. The navigation apparatus according to claim 9, wherein the rule denoted by the priority rule information is a rule for each type of the voice messages.

11. The navigation apparatus according to claim 8, wherein:
the characteristics acquisition receiver is further configured to acquire steering characteristics, braking characteristics, and acceleration characteristics of a driver as the driving performance characteristics of the driver, and
the evaluation score calculator is further configured to calculate a steering evaluation score, a braking evaluation score, and an acceleration evaluation score based on the driving performance characteristics of the driver.

* * * * *